(12) United States Patent
Moriya et al.

(10) Patent No.: US 9,291,784 B2
(45) Date of Patent: Mar. 22, 2016

(54) SEALING COMPONENT, OPTICAL DEVICE SEALING STRUCTURE, METHOD FOR PRODUCING SEALING COMPONENT, AND METHOD FOR PRODUCING OPTICAL DEVICE SEALING STRUCTURE

(71) Applicant: Sumitomo Electric Industries, Ltd., Osaka-shi (JP)

(72) Inventors: Tomomi Moriya, Yokohama (JP); Hiroshi Kohda, Yokohama (JP); Dai Sasaki, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 93 days.

(21) Appl. No.: 14/198,123

(22) Filed: Mar. 5, 2014

(65) Prior Publication Data

US 2014/0254983 A1    Sep. 11, 2014

(30) Foreign Application Priority Data

Mar. 5, 2013  (JP) ................................. 2013-043136
Mar. 11, 2013 (JP) ................................. 2013-047944

(51) Int. Cl.
*G02B 6/42* (2006.01)
*B23K 26/20* (2014.01)
*B65D 53/00* (2006.01)
*G02B 6/35* (2006.01)
*G02B 6/36* (2006.01)

(52) U.S. Cl.
CPC ............ *G02B 6/4251* (2013.01); *B23K 26/206* (2013.01); *B65D 53/00* (2013.01); *G02B 6/3584* (2013.01); *G02B 6/4248* (2013.01)

(58) Field of Classification Search
CPC .... B23K 26/206; B65D 53/00; G02B 6/4251; G02B 6/4254; G02B 6/4255; G02B 6/4256; G02B 6/4257; G02B 6/426; G02B 6/4261
See application file for complete search history.

(56) References Cited

U.S. PATENT DOCUMENTS

| | | | | |
|---|---|---|---|---|
| 4,521,668 A * | 6/1985 | Osial et al. | ............... | 219/121.64 |
| 6,337,760 B1 * | 1/2002 | Huibers et al. | ................. | 359/291 |
| 6,927,098 B2 * | 8/2005 | DCamp et al. | ................. | 438/121 |
| 7,119,984 B2 * | 10/2006 | Macleod et al. | ........... | 360/99.18 |
| 7,233,715 B2 * | 6/2007 | Kazama et al. | ................. | 385/18 |
| 7,317,850 B2 * | 1/2008 | Nakano et al. | ................. | 385/16 |
| 7,808,705 B2 * | 10/2010 | Kobayashi et al. | ........... | 359/618 |
| 8,121,483 B2 * | 2/2012 | Duricic et al. | ................. | 398/83 |
| 2004/0169022 A1 * | 9/2004 | Mega et al. | ............. | 219/121.64 |
| 2004/0184718 A1 * | 9/2004 | Kazama et al. | ................. | 385/18 |

(Continued)

FOREIGN PATENT DOCUMENTS

JP      2009-145887 A       7/2009
WO  WO 2012171692 A1 *  12/2012

*Primary Examiner* — Rhonda Peace
(74) *Attorney, Agent, or Firm* — Venable LLP; Michael A. Sartori; Trent B. Ostler

(57) ABSTRACT

The sealing component 1 of the invention is provided with a metallic housing 19 that comprises a base part 19a, a side wall 19b connected to the base part 19a and an opening portion 19c facing to the base part 19a, and a metallic lid 20 to cover the opening portion 19c, wherein a melted portion 24 is formed around the boundary between the lid 20 and the upper edge 19b1, the melted portion 24 is formed to reach the corner 19b3 of the side wall 19b, and the melted portion 24 has a convexly-curved outward form 24a from the top face of the lid 20 to the corner 19b3 in the longitudinal cross-sectional view of the sealing component 1.

9 Claims, 12 Drawing Sheets

(56) References Cited

U.S. PATENT DOCUMENTS

| | | | |
|---|---|---|---|
| 2004/0223373 A1* | 11/2004 | DCamp et al. | 365/185.23 |
| 2007/0003187 A1* | 1/2007 | Nakano et al. | 385/18 |
| 2009/0214207 A1 | 8/2009 | Duricic et al. | |
| 2009/0270795 A1* | 10/2009 | Elmouelhi et al. | 604/27 |
| 2010/0188724 A1* | 7/2010 | Kobayashi et al. | 359/238 |
| 2010/0258538 A1* | 10/2010 | Suzuki et al. | 219/121.14 |
| 2014/0370370 A1* | 12/2014 | Kawase | 429/176 |

* cited by examiner

SEALING COMPONENT, OPTICAL DEVICE SEALING STRUCTURE, METHOD FOR PRODUCING SEALING COMPONENT, AND METHOD FOR PRODUCING OPTICAL DEVICE SEALING STRUCTURE

This application claims priority from Japanese Patent Applications Nos. 2013-043136, filed on Mar. 5, 2013, and No. 2013-047944, filed on Mar. 11, 2013, the entire contents of which are hereby incorporated by reference.

FIELD OF THE INVENTION

The present invention relates to a sealing component, an optical device sealing structure, a method for producing a sealing component, and a method for producing an optical device sealing structure.

DESCRIPTION OF RELATED ART

JP-A 2009-145887 discloses a reconfigurable optical add/drop module (ROADM) package with an optical element hermetically packaged therein.

SUMMARY OF INVENTION

The ROADM package disclosed in JP-A 2009-145887 has a housing to house an optical element therein. The housing has a base formed of alumina ceramic, and a side wall and a lid formed of Kovar®. The base and the side wall are fixed by soldering, and the side wall and the lid are fixed by soldering, resistance welding or laser welding.

The ROADM package of the type receives an optical signal that contains multiple signal components differing from each other in the wavelength, and outputs the individual signal components dispersed therethrough. Consequently, the package is provided with a dispersive element that disperses an optical signal into the individual signal components, and an optical director (for example, MEMS (micro electro mechanical systems) mirror or LCOS (liquid crystal on silicon)). In the dispersive optics that includes such an optical element and an optical director, an optical signal including multiple signal components and the individual signal components dispersed from the optical signal propagate in the space. Accordingly, when the composition of the vapor contained in the space where the dispersive optics is housed changes and when the refractive index of the vapor thereby fluctuates, then the optical path of the light to be dispersed by the dispersive optics also fluctuates. Consequently, it is necessary to firmly weld the base, the side wall and the lid to constitute the housing for securing high hermetical sealing quality. However, in the ROADM package described in JP-A 2009-145887, there may be a possibility that the bond part between the side wall and the lid of the housing could not secure sufficient hermeticity and strength.

Accordingly, an object of the present invention is to provide a sealing component and an optical device sealing structure that are highly hermetic, and to provide a method for producing a sealing component and a method for producing an optical device sealing structure.

The first aspect of the invention is:

a sealing component to house inside and hermetically seal up an article therein, including:

a metallic housing that comprises a base, a side wall connected to the base, and an opening portion facing to the base, and a metallic lid to cover the opening portion, and wherein:

the side wall has an upper edge to be bonded to the lid, an inner surface and an outer surface, a melted portion of the lid is formed around the boundary between the lid and the upper edge, the melted portion is formed to reach a corner at which the upper edge and the outer surface intersect with each other, and the lid is bonded to the side wall such that the melted portion have a convexly-curved outward form from the top face of the lid to the corner in the longitudinal cross-sectional view of the sealing component.

The second aspect of the invention is a method for producing a sealing component, which comprises:

a step of housing an article inside a metallic housing that comprises a base part, a side wall connected to the base part, and an opening portion facing to the base part, a step of arranging a lid to cover the opening portion, at the upper edge of the side wall, a step of irradiating with laser light from above the lid mounted on the upper edge to thereby form a melted portion of the lid between the lid and the upper edge, and wherein:

in the step of forming the melted portion, the melted portion reaches the corner at which the upper edge and the outer surface of the side wall intersect with each other, and the lid is bonded to the side wall so that the melted portion could have a convexly-curved outward form from the top face of the lid to the corner in the longitudinal cross-sectional view of the sealing component.

The third aspect of the invention is a method for producing a sealing component provided with a sealing space, which comprises:

a preparation step of preparing a metallic housing that has a peripheral wall to form an opening portion, a closing step of arranging a metallic lid on the upper edge face of the peripheral wall, and a welding step of irradiating with laser light at the peripheral edge of the lid to weld the peripheral edge to the upper edge face thereby forming the sealing space, and wherein:

in the welding step, the point to be irradiated with the laser light is, after having been moved from the predetermined start position to the entire length of the peripheral edge, moved toward the outside of the peripheral edge so as to be separated from the welded portion after apart of the welded portion including the start position has been further irradiated with the laser light, and the laser light irradiation is continued without cease until the point to be irradiated with the laser light is moved from the start position toward the outside of the peripheral edge part.

The fourth aspect of the invention is a sealing component, including:

a metallic housing that has a peripheral wall to form an opening portion, and another metallic housing that closes the opening portion and forms a sealing space along with the former housing, and wherein:

the peripheral edge part of the housing forms a weld impression welded to the peripheral wall, the weld impression forms a loop along the peripheral edge part, and a part of the weld impression reaches the outside of the peripheral edge part from the loop.

According to the sealing component of the invention, the strength of the bonding part between the base and the lid can be fully secured, and therefore the inside of the sealing component can be kept in a highly hermetic state.

According to the invention, in a case of forming a sealing space by welding multiple members, the sealing space can be kept in a highly hermetic state.

DETAILED DESCRIPTION OF EXEMPLARY EMBODIMENT

Examples of embodiments of the sealing component, the optical device sealing structure, the method for producing the sealing component, and the method for producing the optical device sealing structure of the invention are described below with reference to the drawings. Of every drawing used in the following description, the scale size can be changed suitably.

Figure 1:
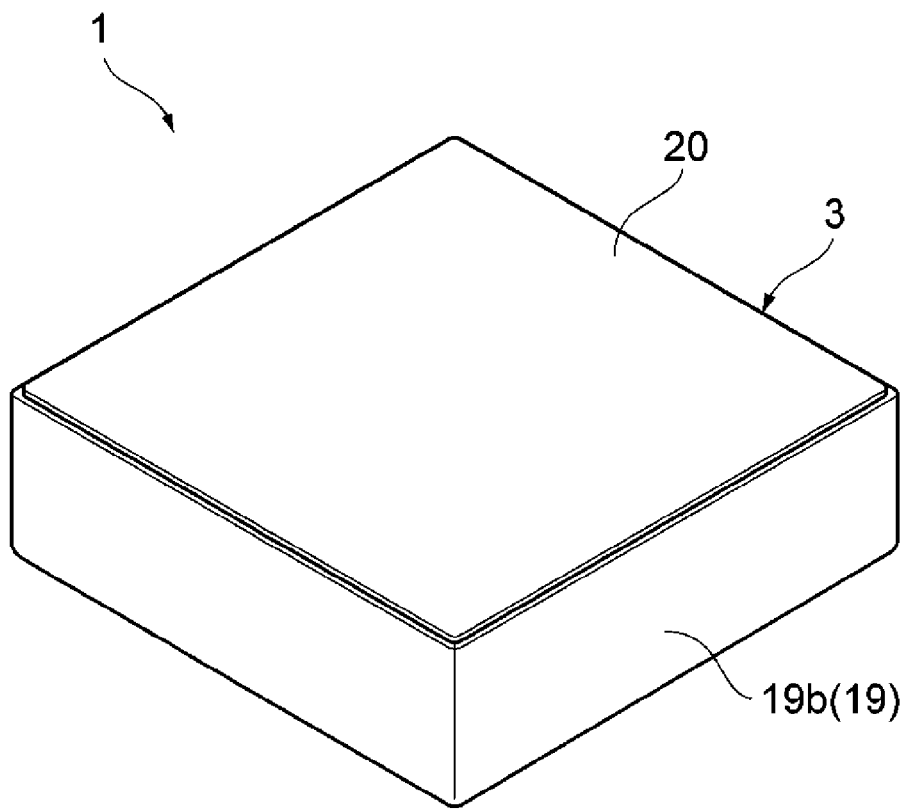
FIG. 1 This is a view showing an optical device sealing structure of the invention.
Figure 2:
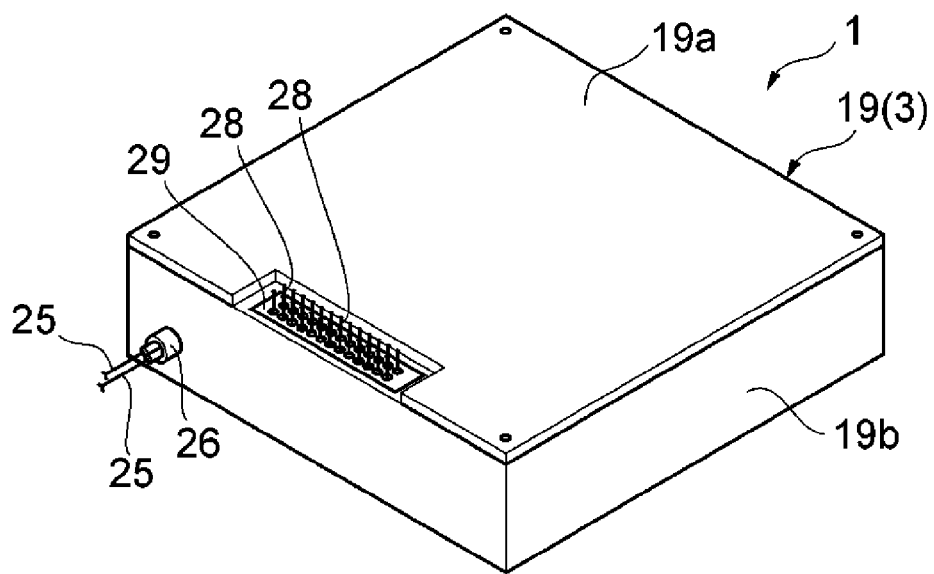
FIG. 2 This is a view showing the bottom of the optical device sealing structure shown in FIG. 1.

FIG. 1 is a view showing an optical device sealing structure of the invention, and FIG. 2 is a view showing the bottom of the optical device sealing structure shown in FIG. 1.

The optical device sealing structure 1 of this embodiment comprises the optical device 2 (see FIG. 3) and the rectangular boxy metallic package 3 (one example of a sealing component) for hermetically sealing the optical device 2. The housing 19 and the lid 20 form the sealing space 30.

In the sealing space 30, the optical device is housed. In this embodiment, the optical device 2 is provided with a dispersive optics that receives an optical signal containing multiple signal components differing from each other in the wavelength and outputs the individual signal components in different directions to thereby separate the multiple signal components. The optical device 2 having the dispersive optics includes a dispersion compensator, a wavelength blocker and a wavelength selective switch.

Figure 3:
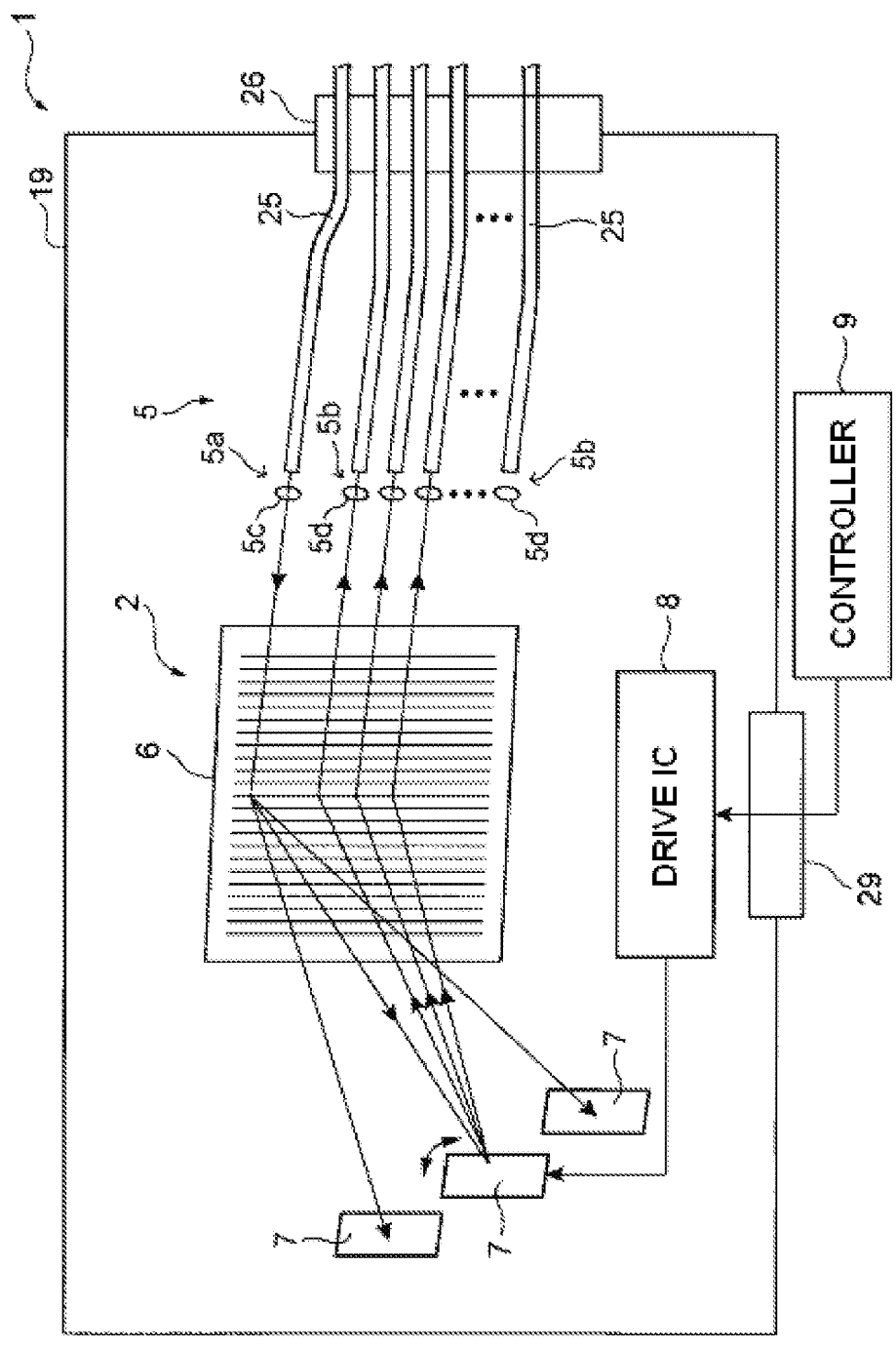
FIG. 3 This is a view showing a wavelength selective optical switch as one example of the optical device to be housed inside the optical device sealing structure shown in FIG. 1.

FIG. 3 shows a wavelength selective switch as one example of the optical device 2. The optical device 2 is provided with the grating 6 as one example of a dispersive element, multiple MEMS (micro-electro-mechanical systems) mirrors 7 as one example of an optical director, and the drive IC 8. The port array 5 is provided with the input port 5a and the output port 5b. As the optical director, preferably used is a reflective liquid-crystal device such as LCOS (liquid crystal on silicon), or a transmissive liquid-crystal device, DMD (digital mirror device), DLP (digital light processing) or the like device in which the optical path can be switched depending on the voltage to be applied thereto.

The port array 5 includes multiple optical fibers 25 introduced thereinto from the outside of the sealing space 30, and the input lens 5c or the output lens 5d. The input port 5a includes the optical fiber 25 for predetermined inputting, and the input lens 5c optically connected thereto. The output port 5b includes the optical fiber 25 for predetermined outputting and the output lens 5d optically connected thereto.

The input light to be inputted from the input port 5a is a wavelength multiplexing optical signal including multiple signal components that differ from each other in the wavelength. The input light is dispersed into predetermined wavelength components by the grating 6, and the individual wavelength components are then outputted in different directions. Each wavelength component forms an image on the corresponding MEMS mirror 7 via a focusing lens (not shown).

Each MEMS mirror 7 is a mirror produced through micromachining technology, and has multiple reflecting surfaces. These multiple reflecting surfaces are elastically supported, and is so configured that the angle of the reflecting surface could be changed depending on the level of the control voltage to be applied to the individually provided actuator. Specifically, the tilt angle of the reflecting surface can be electrically controlled by the drive IC 8, and the light path of the corresponding inputted wavelength component is thereby controlled.

Each MEMS mirror 7 receives each wavelength component outputted from the grating 6, and reflects it toward any of the output ports 5b. Each wavelength component passes through a focusing lens (not shown) and the grating 6, and through the output lens 5d provided at the output port 5b. With that, this is outputted outside the sealing space 30, after having propagated inside the optical fiber 25 for outputting that is optically connected to the output lens 5d. In case where multiple MEMS mirrors 7 reflect the inputted signal components toward one and the same output port 5b, the multiple signal components differing from each other in the wavelength are combined inside the connected optical fiber 25.

The optical device sealing structure 1 that houses the dispersive optics for optical communication is preferably such that the gas leakage though the sealing space therein is $5 \times 10^{-9}$ Pa·m$^3$/sec or less.

As shown in FIG. 2 and FIG. 3, the housing 19 is provided with the fiber feedthrough 26. The fiber feedthrough 26 is a member for introducing the optical fiber 25 from the outside to the inside of the sealing space 30.

Figure 4:
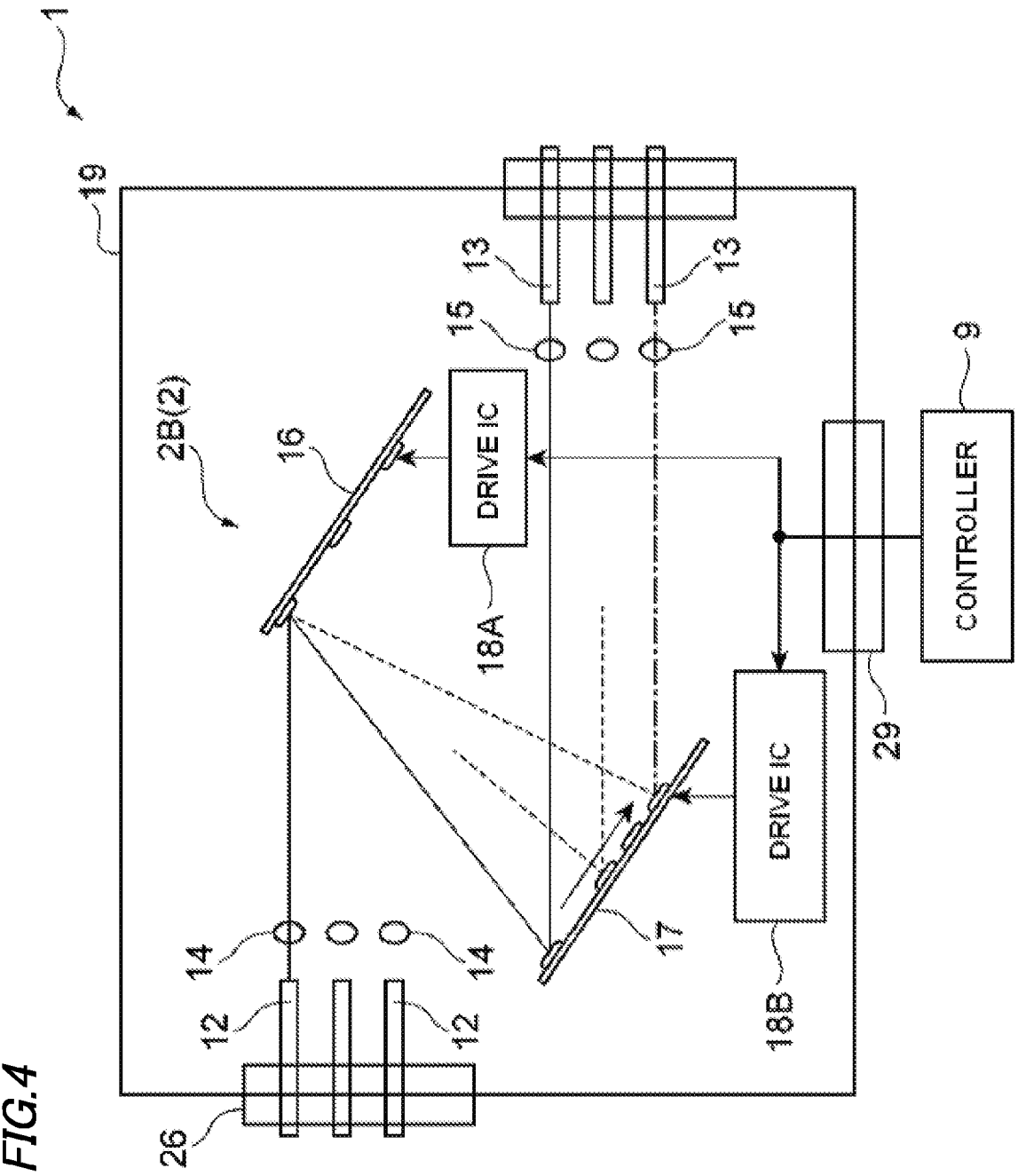
FIG. 4 This is a view showing an optical switch as one example of the optical device to be housed inside the optical device sealing structure shown in FIG. 1.

The optical device 2 may also be an ordinary optical switch 2B, as shown in FIG. 4. The optical switch 2B has multiple optical fibers 12 for forming an input port, multiple optical fibers 13 for forming an output port, multiple lenses 14 for collimating the light outputted from each optical fiber 12, multiple lenses 15 for focusing the light to be inputted into each optical fiber 13, MEMS mirrors 16 and 17 for deflecting the light having passed through the lens 14 toward the corresponding optical fiber 13, and drive IC 18A and 18B for driving the MEMS mirrors 16 and 17, respectively. The drive IC 18A and 18B are electrically connected to the outside controller 9 via the electric feedthrough 29 provided through the housing 19, as described below.

Figure 5:
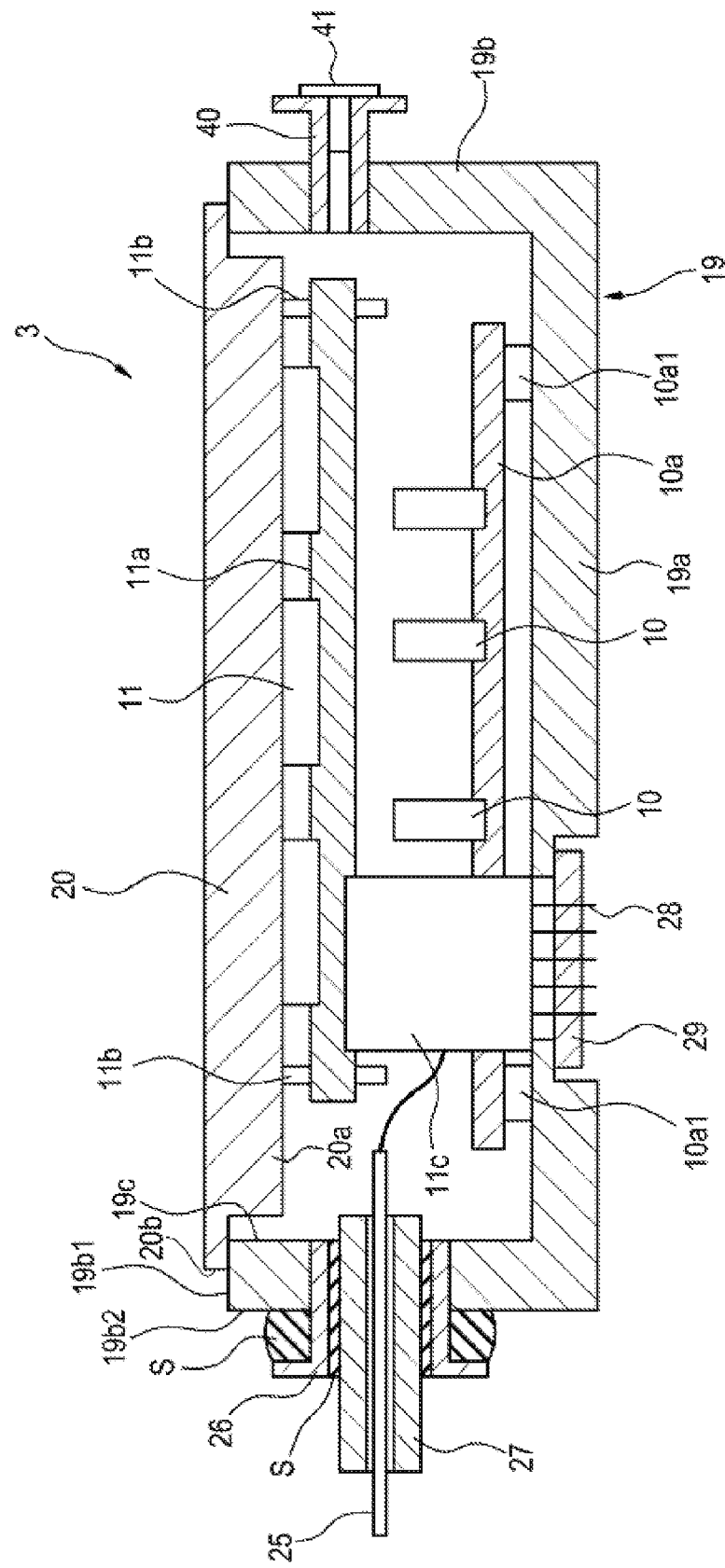
FIG. 5 This is a cross-sectional view of the optical device sealing structure shown in FIG. 1.

The metallic package 3 has the housing 19 to house the optical device 2, and the lid 20 provided at the top of the housing 19 to cover the opening of the housing 19, as shown in FIG. 5. The housing 19 is composed of the base 19a, and the side wall 19b connected to the base 19a, and has the opening portion 19c that faces to the lid 20. The base 19a is provided with the support 10a1 on which the optical substrate 10a is mounted. The base 19a and the side wall 19b may be formed by bonding with a solder or the like after a metal plate has been cut, or may be integrally formed by casting.

Figure 6A:
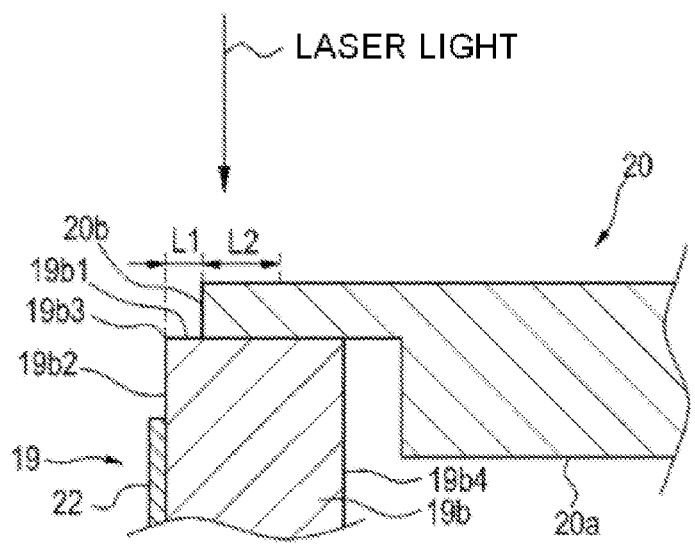
FIG. 6A This is an enlarged cross-sectional view showing the configuration in bonding the housing and the lid of the optical device sealing structure shown in FIG. 5.
Figure 6B:
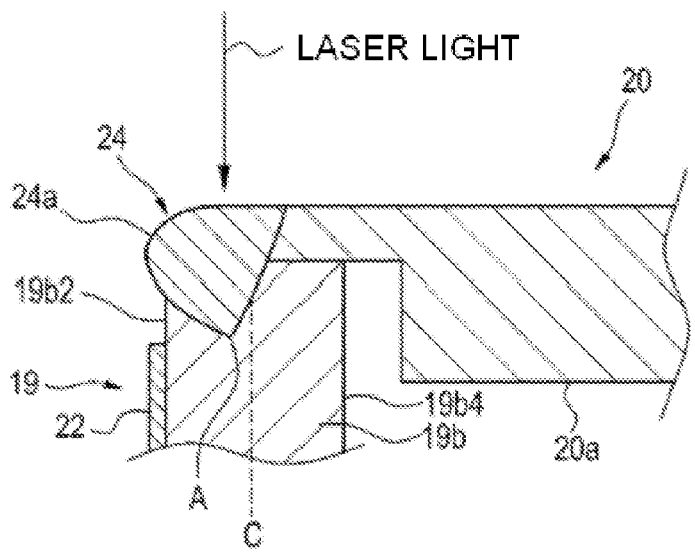
FIG. 6B This is an enlarged cross-sectional view showing a melted portion formed in the bonding part between the housing and the lid.
Figure 6C:
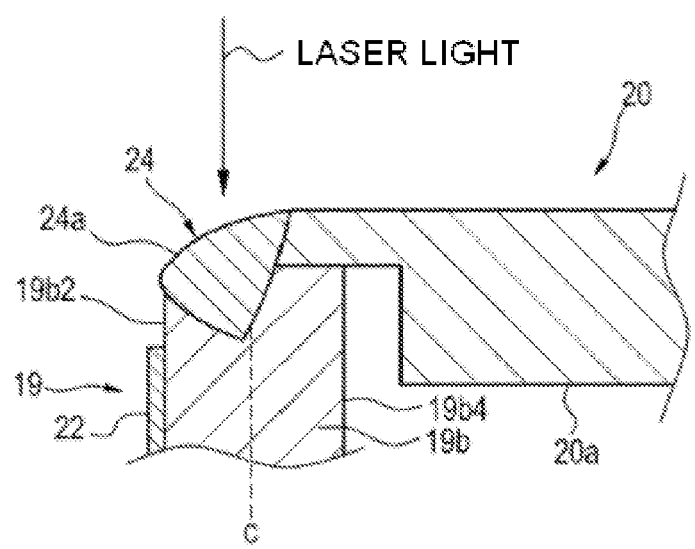
FIG. 6C This is an enlarged cross-sectional view showing a modification of the weld part.

The lid 20 has an area somewhat smaller than the area defined by the corner 19b3 between the upper edge 19b1 and the outer surface 19b2 of the side wall 19b of the housing 19 (see FIG. 6A to FIG. 6C). Consequently, in the state where the opening portion 19c of the housing 19 is covered with the lid 20, the outer peripheral part 20b of the lid 20 is arranged more inside than the corner 19b3 of the housing 19. The lid 20 has the protruding portion 20a that protrudes in the inside direction of the housing 19 for positioning thereof when arranged on the housing 19. Preferably, the protruding portion 20a is so configured that, in the state where the lid 20 is arranged on the upper edge 19b1 of the housing 19, it is spaced from the inner surface 19b4 of the side wall 19b via a predetermine clearance therebetween. The clearance could be 0.3 mm or so.

The housing 19 and the lid 20 are formed of a light metal such as aluminium (Al), aluminium alloy (Al alloy), magnesium (Mg), magnesium alloy (Mg alloy) or the like. Concretely, preferred is use of an Al—Mn-based alloy (melting point: 654° C.), an Al—Si-based alloy (melting point: 580° C.), an Al—Mg-based alloy (melting point: 649° C.) or the like. Especially preferably, the metal to form the lid 20 has an Si content in a compositional ratio of 0.3% or less and a Cu content in a compositional ratio of 0.1% or less.

Preferably, the metal to form the lid 20 has a smaller foam content than the metal to form the housing 19. Concretely, the foam content in the metal to form the lid 20 is preferably 5 ml/100 g or less, more preferably 3 ml/100 g or less. Consequently, in this embodiment, it is desirable that the lid 20 is formed according to a rolling method or the like, rather than a die-casting method in which the foam content would increase by casting.

As shown in FIG. 6A, on the outer surface 19b2 of the side wall 19b, formed is a metal layer 22 that differs from the metal to form the housing 19 and the lid 20. For example, the metal layer 22 is preferably a nickel layer. The metal layer 22 is not provided in a partial region below the corner 19b3 of the side wall 19b. This is in order to prevent the melted portion 24 to be mentioned below from being kept in contact with the metal layer 22.

As shown in FIG. 5, the housing 19 is provided with the fiber feedthrough 26 for making the inside and the outside of the housing 19 spatially communicate with each other via optical fibers running therethrough, the electric feedthrough 29 for electrically connecting the inside and the outside of the housing 19 to each other, and the gas introducing portion 40 capable of introducing a sealant gas into the inside of the housing 19 therethrough.

In the side wall 19b of the housing 19, provided is the above-mentioned fiber feedthrough 26 to pass through the side wall 19b. The fiber feedthrough 26 makes the inside and the outside of the housing 19 spatially communicate with each other, and is so configured as to make it possible to introduce multiple optical fibers 25 (corresponding to the optical fiber 4 shown in FIG. 3, and the optical fibers 12 and 13 shown in FIG. 4) into the housing 19.

Preferably, the optical fiber 25 is coated with a low linear expansion coefficient metal 27 of which the linear expansion coefficient is close to that of the optical fiber 25 (for example, Kovar (alloy containing Fe, Ni, Co)). Coating the optical fiber 25 with a material of which the linear expansion coefficient is close to that of the optical fiber 25 in that manner makes it possible to prevent the optical fiber 25 from being damaged by expansion and contraction of the member owing to the change of the environmental temperature.

The low linear expansion coefficient metal 27 is bonded to the fiber feedthrough 26 by the solder S. The fiber feedthrough 26 is bonded to the metal layer 22 formed on the outer surface 19b2 of the side wall 19b by the solder S.

In the base 19a of the housing 19, provided is the above-mentioned electric feedthrough 29 for introducing multiple electroconductive pins (electric wires) 28 into the housing 19. The electric feedthrough 29 holds multiple electroconductive pins 28, as shown in FIG. 5. The electric feedthrough 29 is formed of, for example, a stainless material, and the part thereof through which the electroconductive pins 28 run is formed of melt glass or the like for securing electric insulation.

Both end parts (stainless parts) of the electric feedthrough 29 are bonded to the base part 19a by solder S. As the solder S, usable is the same material as that for bonding the above-mentioned fiber feedthrough 26.

The electroconductive pins 28 in the electric feedthrough 29 can be electrically connected to an external circuit substrate or the like. For example, as shown in FIG. 3, they may be connected to the controller 9 to control the movement of the optical engine 11 that includes the MEMS mirror 7. Specifically, the MEMS mirror 7 can be electrically driven/controlled via the drive IC 8 and the controller 9.

The gas introducing part 40 is so provided in the side wall 19b that the inside and the outside of the housing 19 could be spatially communicated with each other, as shown in FIG. 5. With that, the part is so configured that, after a sealant gas is introduced into the inside of the housing 19, it can be sealed up with a predetermined cap 41. Like the above-mentioned fiber feedthrough 26, the gas introducing part 40 is formed of, for example, a stainless material and is bonded to the side wall 19b with solder S.

The optical substrate 10a on which multiple optical members 10 are mounted has the support 10a1, and the support 10a1 is fixed to the base 19a of the housing 19. The electric substrate 11a on which multiple optical engines (electric members) 11 are mounted is, while kept fitted on the inner side of the lid 20 by the screw 11b, housed inside the housing 19. One end of the wiring member 11c is electrically connected to the electric substrate 11a. The other end of the wiring member 11c is electrically connected to the electroconductive pins 28.

The lid 20 to which the electric substrate 11a is fixed is mounted on the upper edge 19b1 of the side wall 19b of the housing 19, and the housing 19 and the lid 20 are bonded to each other by the melted portion 24. As shown in FIG. 6B, the melted portion 24 is so formed as to reach the outer surface 19b2 of the side wall 19b, and in the longitudinal cross-sectional view of the metallic package 3, it is desirable that the melted portion 24 has a convexly-curved outward form to protrude from the outer surface 19b2. The melted portion 24 is so formed as to reach the corner 19b3 between the upper edge 19b1 and the outer surface 19b2 of the side wall 19b, and is bonded to the side wall 19b in such a manner that, in the longitudinal cross-sectional view of the metallic package 3, the melted portion 24 could have the convexly-curved portion 24a provided with a convexly-curved outward form from the upper edge 19b1 to the corner 19b3 of the side wall 19b.

In the longitudinal cross-sectional view of the metallic package 3, the melted portion 24 has a radial form that expands radially from the deepest part A thereof toward the outer surface 19b2 of the side wall 19b. Preferably, the deepest part A is positioned on a more outer side than the center C in the thickness direction of the side wall 19b. Further, the melted portion 24 protruding from the outer surface 19b2 is preferably so configured that it is not kept in contact with the metal layer 22 provided at least in a part of the outer surface 19b2.

(First Embodiment)

Figure 7:
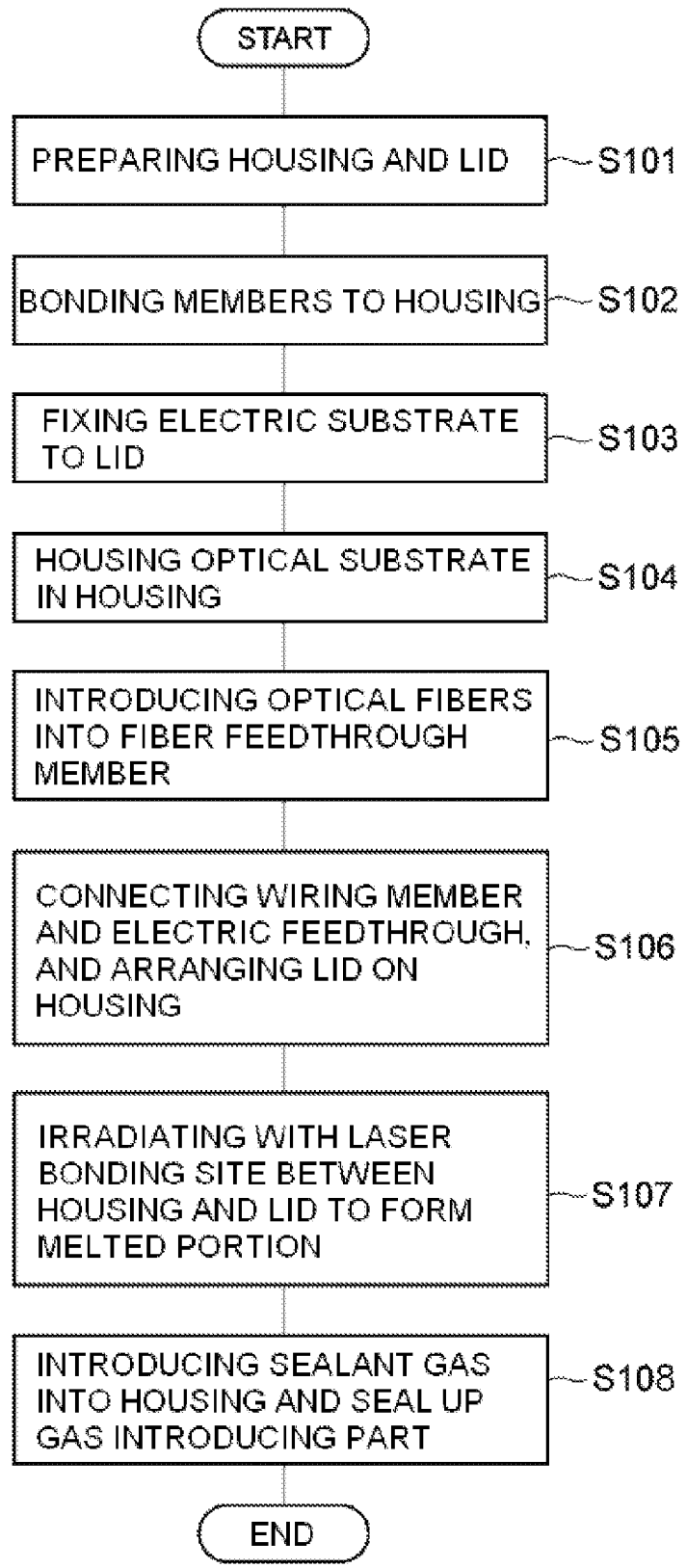
FIG. 7 This is a flowchart showing the steps of an optical device sealing method for forming the optical device sealing structure shown in FIG. 5.

Next described is the first embodiment of an optical device sealing method for forming the optical device sealing structure as above, with reference to the flowchart shown in FIG. 7.

First, the housing 19 and the lid 20 formed of a light metal of any of Al, Al alloy, Mg and Mg alloy are prepared (step S101). The metal layer (for example, nickel plate layer) 22 is formed on the housing 19. In this stage, a predetermined region on the upper edge 19b1 in the outer surface 19b2 of the side wall 19b is masked so as not to be coated with the metal layer 22. Otherwise, the metal layer 22 in the region may be removed after plating.

Next, the fiber feedthrough 26, the electric feedthrough 29 and the gas introducing part 40 are bonded to the housing 19 (step S102). In this step, these members are bonded to the metal layer 22 provided on the surface of the housing 19, by the solder S having a lower melting point than the metal layer 22. Preferably, this step is carried out at a temperature higher than the melting point of the solder S and is lower than the melting point of the metal layer 22. Concretely, the reflow step of heating the whole of the housing 19 is carried out in the state where these members and the solder are kept arranged in the position of the housing 19 at which each member is to be bonded. In that manner, even if there are multiple members to be bonded to the housing 19, they can be bonded to the housing all at a time.

In this embodiment, the fiber feedthrough 26, the electric feedthrough 29 and the gas introducing part 40 are fixed to the housing 19 all at a time by solder reflow. Specifically, while the solder S and the fiber feedthrough 26 are kept arranged in the bonding positions of these members on the side wall 19b, the solder S and the gas introducing part 40 are kept arranged in the other bonding positions on the side wall 19b, and the solder S and the electric feedthrough 29 are kept arranged on the base 19a, the whole of the housing 19 is heated to thereby bond the fiber feedthrough 26, the electric feedthrough 29 and the gas introducing part 40 to the housing 19.

Next, with multiple optical engines 11 mounted on the electric substrate 11a, one end part of the wiring member 11c is connected, and the electric substrate 11a is fixed by screwing to the lid 20 (step S103).

Next, multiple optical members 10 are positioned on the optical substrate 10a and fixed thereto through adhesion, screwing or the like, and the optical substrate 10a is fixed to the base part 19a (step S104).

Next, multiple optical fibers 25 including an input port for inputting a predetermined optical signal and an output port for outputting a predetermined optical signal are introduced into the fiber feedthrough 26, and the thus-introduced multiple optical fibers 25 are individually connected to multiple optical members 10 (step S105). Concretely, the optical fibers supported by the low linear expansion coefficient metal 27 are prepared, and these are fixed to the fiber feedthrough 26. In this step, preferably, the low linear expansion coefficient metal 27 is soldered to the fiber feedthrough 26. With that, preferably, the metal layer 22 formed on the housing 19 and the fiber feedthrough 26 are soldered to the housing 19.

Next, after the other end part of the wiring member 11c connected to the electric substrate 11a fixed to the lid 20 is connected to the electric feedthrough 29, the lid 20 is arranged at the upper edge 19b1 of the housing 19 (step S106). In this stage, the protruding portion 20a of the lid 20 is provided via a clearance as spaced from the inner surface 19b4 of the side wall 19b.

Next, in the state where the lid 20 is kept on the housing 19, the bonding part between the housing 19 and the lid 20 is irradiated with laser light to thereby form the melted portion 24 (step S107). The housing 19 could not be bonded by solder reflow to the lid 20, like that the fiber feedthrough 26 and the electric feedthrough 29 are bonded all at a time by solder reflow, because at the time when the housing 19 is bonded to the lid 20, the optical device 2 has been already housed in the housing 19 in this step. Accordingly, as the bonding method for the housing 19 and the lid 20, laser welding is suitable. Further, the welding of the housing 19 and the lid 20 can be attained without much thermal impact to the optical member 10 mounted on the optical substrate 10a, because the laser irradiation is attained from the above of the lid 20 in the state where the optical substrate 10a is kept fixed to the base 19a that is the bottom of the housing 19 and where the electric substrate 11a is kept fixed on the protruding portion 20a provided on the inner surface side of the lid 20.

The melted portion may be formed through laser welding. For the laser welding, for example, a fiber laser which provides the outer diameter of the beam spot of the laser light is ϕ0.2 mm or less, preferably ϕ0.1 mm or so. Using such a fiber laser having a small beam spot diameter makes it possible to favorably form the melted portion 24 to be mentioned below. In this stage, the value to be calculated by dividing the distance L1 (see FIG. 6A) between the outer edge 20b of the lid 20 and the corner 19b3 of the side wall 19b before laser irradiation, by the outer diameter of the laser beam spot is referred to as X, and 0<X<7, preferably 0<X<5. Specifically, when a fiber laser of which the beam spot diameter is ϕ0.1 mm is used, it is desirable that the length L1 from the corner 19b3 of the side wall 19b to the outer edge 20b of the lid 20 in the state where the opening portion 19c of the housing 19 is covered with the lid 20 is 0.7 mm or less, preferably 0.5 mm or less. When the length L1 from the corner 19b3 of the side wall 19b to the outer edge 20b of the lid 20 is 0.7 mm or less, preferably 0.5 mm or less, then the melted portion 24 having the convexly-curved portion 24a can be formed surely.

As shown in FIG. 6A, the laser light from the fiber laser is applied from the above of the lid 20 mounted on the upper edge 19b1 of the side wall 19b. With that, as shown in FIG. 6B, the melted portion 24 of the lid 20 is formed at around the boundary between the lid 20 and the upper edge 19b1 of the side wall 19b. In this stage, it is desirable that the laser light irradiation could reach the inside region to the distance L2 from the outer edge 20b of the lid 20. Concretely, the distance L2 is divided by the outer diameter of the laser beam spot to give a value Y, and 0<Y<7, preferably 1≤Y≤5. In this embodiment, when a fiber laser having a beam spot diameter of φ0.1 mm is used, it is desirable that L2 is larger more than 0 mm and less than 0.7 mm, more preferably larger more than 0.1 mm and less than 0.5 mm. In the laser welding in this embodiment as above, the requirement for the laser irradiation position accuracy can be relaxed, because the melted portion 24 can be favorably formed even though the laser irradiation position fluctuates within the range of L2. In particular, any inexpensive apparatus may be used for providing the laser light having a beam spot diameter of 0.1 mm or more.

Finally, a sealant gas is introduced into the housing 19 from the gas introducing part 40, and the gas introducing part 40 is sealed up with a predetermined cap 41 (step S108). Accordingly, the optical characteristics of the optical device 2 can be kept constant. In that manner, the optical device 2 is hermetically sealed up by the metallic package 3.

As described above, according to this embodiment, the melted portion 24 is so provided as to have the convexly-curved outward form, and is thereby thick-walled. Accordingly, a sufficient bonding strength between the housing 19 and the lid 20 can be secured. Consequently, it has become possible to apply the housing 19 and the lid 20 formed of a light metal such as aluminium (Al), magnesium (Mg) or the like, therefore enabling weight reduction and cost reduction.

Further according to this embodiment, the melted portion 24 is so formed as to reach the outer surface 19b2 of the sidewall 19b, and the melted portion 24 has the convexly-curved outward form that protrudes from the outer surface 19b2 of the side wall 19b in the longitudinal cross-sectional view of the metallic package 3. Accordingly, further thickening of the melted portion 24 can be realized to thereby increase the bonding strength.

Also according to this embodiment, the melted portion 24 has the radial form that expands radially from the deepest part A thereof toward the outer surface 19b2 of the side wall 19b in the in the longitudinal cross-sectional view of the metallic package 3, and the deepest part A is positioned on a more outer side than the center C in the thickness direction of the side wall 19b. Consequently, the corner 19b3 between the upper edge 19b1 and the outer surface 19b2 of the side wall 19b can be thickened, therefore securing the strength thereof.

Further according to this embodiment, the melted portion 24 protruding toward the outer surface 19b2 of the side wall 19b is configured not to be kept in contact with the metal layer 22 provided at least partly in the outer surface 19b2, note that the metal layer 22 is formed of a metal that differs from the metal to form the housing 19. Consequently, the weldability can be prevented from being worsened owing to the contact of the melted portion 24 with the metal layer 22.

Also according to this embodiment, the lid 20 has the protruding portion 20a that protrudes in the inside direction of the housing 19, on the more inner side than the melted portion 24, and the protruding portion 20a is provided via a clearance as spaced from the side wall 19b. Consequently, it is easy to position the lid 20 relative to the housing 19, and in addition, since a heat-insulating space can be formed by the clearance, it is possible to prevent the heat by laser irradiation from diffusing inside the housing 19.

Also this embodiment is so configured that the melted amount of the lid 20 is larger than the melted amount of the housing 19, and the foam content in the lid 20 is smaller than in the housing 19. Consequently, the lid 20 having a smaller foam content may be melted in a larger amount, and therefore, the melted portion can be prevented from foaming or cracking during laser welding and the sealing quality can be thereby enhanced.

Also according to this embodiment, the metal to form the lid 20 has an Si content in a compositional ratio of 0.3% or less. Consequently, Si crystallization can be prevented during laser welding, and cracking can also be prevented.

Also according to this embodiment, the metal to form the lid 20 has a Cu content in a compositional ratio of 0.1% or less. In that manner, because the melted amount of the lid 20 is larger than the melted amount of the housing 19 and the Cu content in the lid 20 can be kept low, the optical device sealing structure 1 having good corrosion resistance and having high long-term reliability can be provided here.

Also according to this embodiment, in the optical device sealing structure 1 that is required to have high hermetically-sealing quality as dealing with dispersed light, the sealing gas can be prevented from leaking through such the sealing member as metallic package 3, and therefore the sealing quality can be sufficiently secured.

EXAMPLES

Examples of the optical device sealing structure of this embodiment are described below. Here, as shown in Table 1 below, the form of the melted portion was evaluated by changing the laser irradiation position and forming optical device sealing structures.

TABLE 1

| | Material | | Laser Welding Condition | | | | |
|---|---|---|---|---|---|---|---|
| | Housing | Lid | Method | Beam Diameter | L1 | L2 | Quality |
| Example 1 | Al—Mg Alloy (m.p. 650° C.) | Al—Mg Alloy (m.p. 650° C.) | Laser Welding | φ 0.1 mm | 0.35 mm | 0.3 mm | ○ |
| Example 2 | | | | | | 0.5 mm | ○ |
| Example 3 | | | | | | 0.7 mm | Δ |
| Comparative Example 1 | | | | | | 0.75 mm | x |
| Example 4 | | | | | 0.35 mm | 0.1 mm | ○ |
| Example 5 | | | | | | 0.3 mm | ○ |
| Example 6 | | | | | | 0.5 mm | ○ |
| Example 7 | | | | | | 0.7 mm | Δ |
| Example 8 | | | | | φ 0.2 mm | 0.7 mm | 0.7 mm | ○ |
| Example 9 | | | | | | 1 mm | 1 mm | ○ |

In Examples 1 to 3 and Comparative Example 1, a fiber laser providing laser light having a beam spot diameter φ of 0.1 mm was used, and the length L1 from the corner of the side wall to the outer edge of the lid in the state where the opening portion of the housing was kept covered with the lid was changed in a range of from 0.35 mm to 0.75 mm. The laser irradiation position L2 was inside by 0.3 mm from the outer edge of the lid, and the housing and the lid were welded by laser welding. In Example 1, L1 was 0.5 mm, and the housing and the lid were welded by laser welding. In Example 3, L1 was 0.7 mm, and the housing and the lid were welded by laser welding. In Comparative Example 1, L1 was 0.75 mm, and the housing and the lid were welded by laser welding. In Examples 1, 2, 3 and Comparative Example 1, the material to form the housing and the lid was an Al—Mg-based alloy (melting point: 650° C.).

Figure 8:
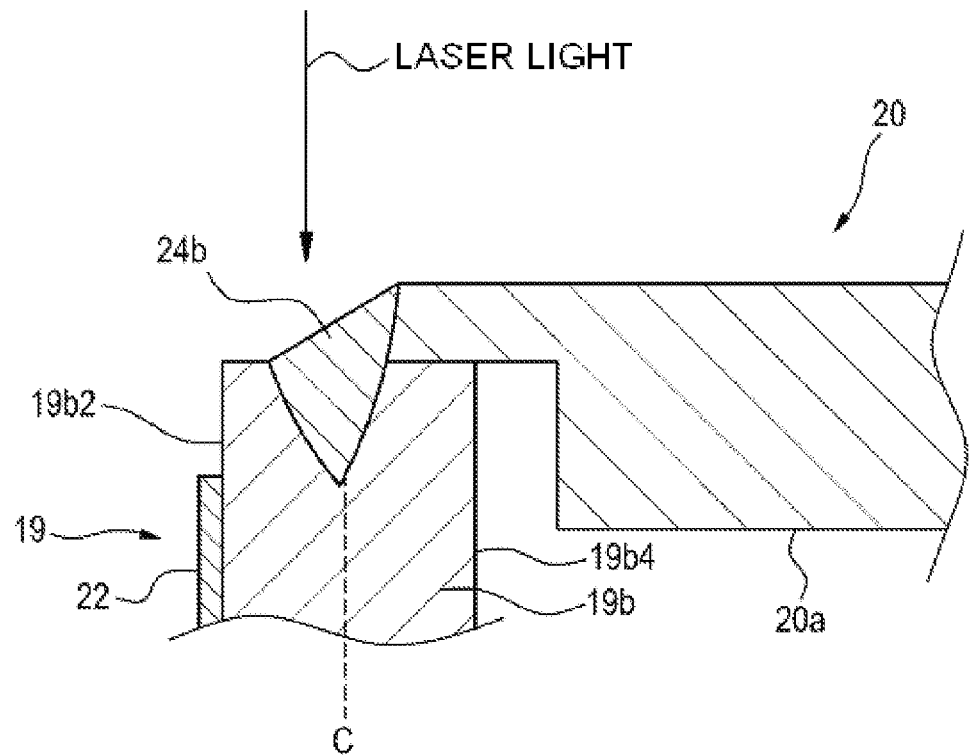
FIG. 8 This is an enlarged cross-sectional view showing a welt part in Comparative Examples of the above embodiment.

As a result, the melted portion in Examples 1 and 2 had a convexly-curved outward form from the top face of the lid to the corner of the housing and had a sufficient thickness, as shown by the schematic view of FIG. 6B. The melted portion in Example 3 also had a convexly-curved outward form though gentler than the melted portion in Examples 1 and 2, as shown by the schematic view of FIG. 6C. On the other hand, the melted portion in Comparative Example 1 has a linear outward form from the upper edge 19b1 to the corner 19b3 and was obviously thinned as compared with that in Examples 1 to 3, as shown by the schematic view of FIG. 8. The above confirms the effectiveness in Examples 1 to 3.

Of the results of Examples 1 to 3, the results of Examples 1 and 2 are better, from which it is confirmed that the laser irradiation position is preferably inside by 0.7 mm or less, more preferably by 0.5 mm or less from the outer edge of the lid. In consideration of the laser irradiation position error latitude of ±0.05 mm or so, it is favorable that the laser light is applied to the position inside by 0.1 mm or more from the outer edge of the lid.

In Examples 4 to 7, a fiber laser providing laser light having a beam spot diameter φ of 0.1 mm was used, and the length L1 from the corner of the side wall to the outer edge of the lid was 0.35 mm in the state where the opening portion of the housing was kept covered with the lid. The laser irradiation position L2 was changed in a range of from 0.1 mm to 0.7 mm inside the outer edge of the lid, and the housing and the lid were welded by laser welding. In Example 4, the laser irradiation position L2 was inside by 0.1 mm from the outer edge of the lid, and the housing and the lid were welded by laser welding. In Example 5, the laser irradiation position L2 was inside by 0.3 mm from the outer edge of the lid, and the housing and the lid were welded by laser welding. In Example 6, the laser irradiation position L2 was inside by 0.5 mm from the outer edge of the lid, and the housing and the lid were welded by laser welding. In Example 7, the laser irradiation position L2 was inside by 0.7 mm from the outer part of the lid, and the housing and the lid were welded by laser welding. In Examples 4 to 7, the material to form the housing and the lid was an Al—Mg-based alloy (melting point: 650° C.).

As a result, the melted portion in Examples 4 to 6 had a convexly-curved outward form from the top face of the lid to the corner of the housing and had a sufficient thickness, as shown by the schematic view of FIG. 6B. The melted portion in Example 7 also had a convexly-curved outward form though gentler than the melted portion in Examples 1 and 2, as shown by the schematic view of FIG. 6C. From the above, it is confirmed that the laser light is preferably applied to the position inside by 0.7 mm or less, more preferably by 0.5 mm or less, from the outer edge of the lid. In consideration of the laser irradiation position error latitude of ±0.05 mm or so, it is favorable that the laser light is applied to the position inside by 0.1 mm or more from the outer edge of the lid.

In Examples 8 and 9, a fiber laser providing laser light having a beam spot diameter φ of 0.2 mm was used, and the length L1 from the corner of the side wall to the outer edge of the lid in the state where the opening portion of the housing was kept covered with the lid, and the distance L2 from the outer edge of the lid to the laser irradiation position were changed in a range of from 0.7 to 1 mm. In Example 8, L1 was 0.7 mm and L2 was 0.7 mm, and the housing and the lid were welded by laser welding. In Example 9, L1 was 1 mm and L2 was 1 mm, and the housing and the lid were welded by laser welding. In Examples 8 and 9, the material to form the housing and the lid was an Al—Mg-based alloy (melting point: 650° C.).

As a result, the melted portion in Examples 8 and 9 had a convexly-curved outward form from the top face of the lid to the corner of the housing and had a sufficient thickness, as shown by the schematic view of FIG. 6B. From the above, it is confirmed that the laser light is preferably applied to the position inside by 0.7 mm or less, more preferably by 0.5 mm or less, from the outer edge of the lid. In consideration of the laser irradiation position error latitude of ±0.05 mm or so, it is favorable that the laser light is applied to the position inside by 0.1 mm or more from the outer edge of the lid. The above confirms that, when the value calculated by dividing L1 by the outer diameter of the laser beam spot is referred to as X, then it is effective that $0<X<7$, preferably $0<X<5$, and that, when the value calculated by dividing L2 by the outer diameter of the laser beam spot is referred to as Y, then it is effective that $0<Y<7$, preferably $1 \leq Y \leq 5$. However, for laser welding with laser light having a beam spot diameter φ of 0.2 mm, the thickness of the housing must be increased as compared with the case where laser light having a beam spot diameter φ of 0.1 mm is used, and therefore, the former case is disadvantageous in point of weight reduction and cost reduction.

While the present invention has been described in detail and with reference to this embodiment, it will be apparent to one skilled in the art that various changes and modifications can be made therein without departing from the spirit and scope thereof.

Figure 9:
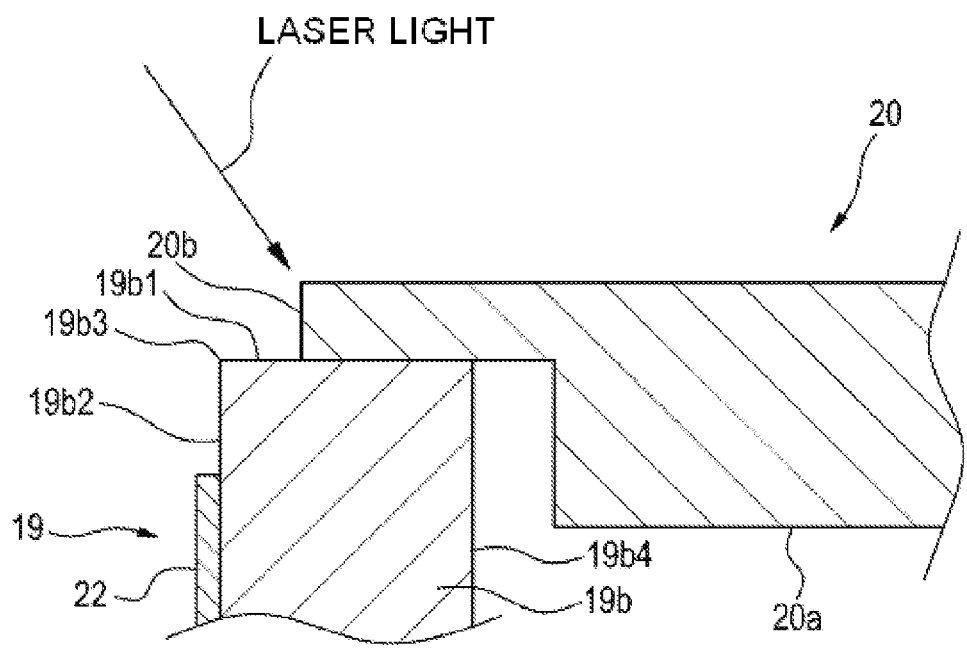
FIG. 9 This is an enlarged cross-sectional view showing the configuration in bonding the housing and the lid of an optical device sealing structure of a modification of the above embodiment.

In the embodiment described hereinabove, the laser irradiation is applied to the top face of the lid 20, to which, however, the invention is not limited. For example, laser irradiation may also be applied in an oblique direction to the top face of the lid 20 at the bonding site between the upper edge 19b1 of the side wall 19b and the lid 20, as shown in FIG. 9. According to this constitution, the heat during laser irradiation could readily propagate to the side wall 19b of the housing 19 that constitutes a part of the melted portion 24, and the bonding strength between the side wall 19b and the lid 20 can be thereby further increased.

(Second Embodiment)

Next, with reference to FIG. 10 to FIG. 16, a production method for the sealing member 1 having the above-mentioned configuration is described below.

First, as one example of a preparation step, the above-mentioned housing 19 is prepared (step S11 in FIG. 10), and the fiber feedthrough 26, the electric feedthrough 29 and the gas introducing part (duct) 40 are bonded to the housing 19. The bonding is attained, for example, by well-known solder reflow treatment.

Next, a part of the optical device 2 including the optical substrate 10a is arranged inside the housing space (step S12 in FIG. 10), and fixed onto the bottom wall 19c. On the other hand, another part of the optical device 2 including the electric substrate 11a is fixed onto the inner face 20b of the lid 20.

With that, the electric portion of the electric substrate 11a is electrically connected to the electroconductive pin 28 of the electric feedthrough 29 by the wiring member 12.

Next, multiple optical fibers 25 each coated with the metallic coating material 27 are inserted through the fiber feedthrough 26. The tip of each optical fiber 25 is optically connected to the input lens 5c and the output lens 5d corresponding to the optical device 2. Otherwise, the port array 5 including the optical fibers 25 each connected to the input lens 5c and the output lens 5d is optically connected to the dispersive optics of the optical device 2.

Figure 10:
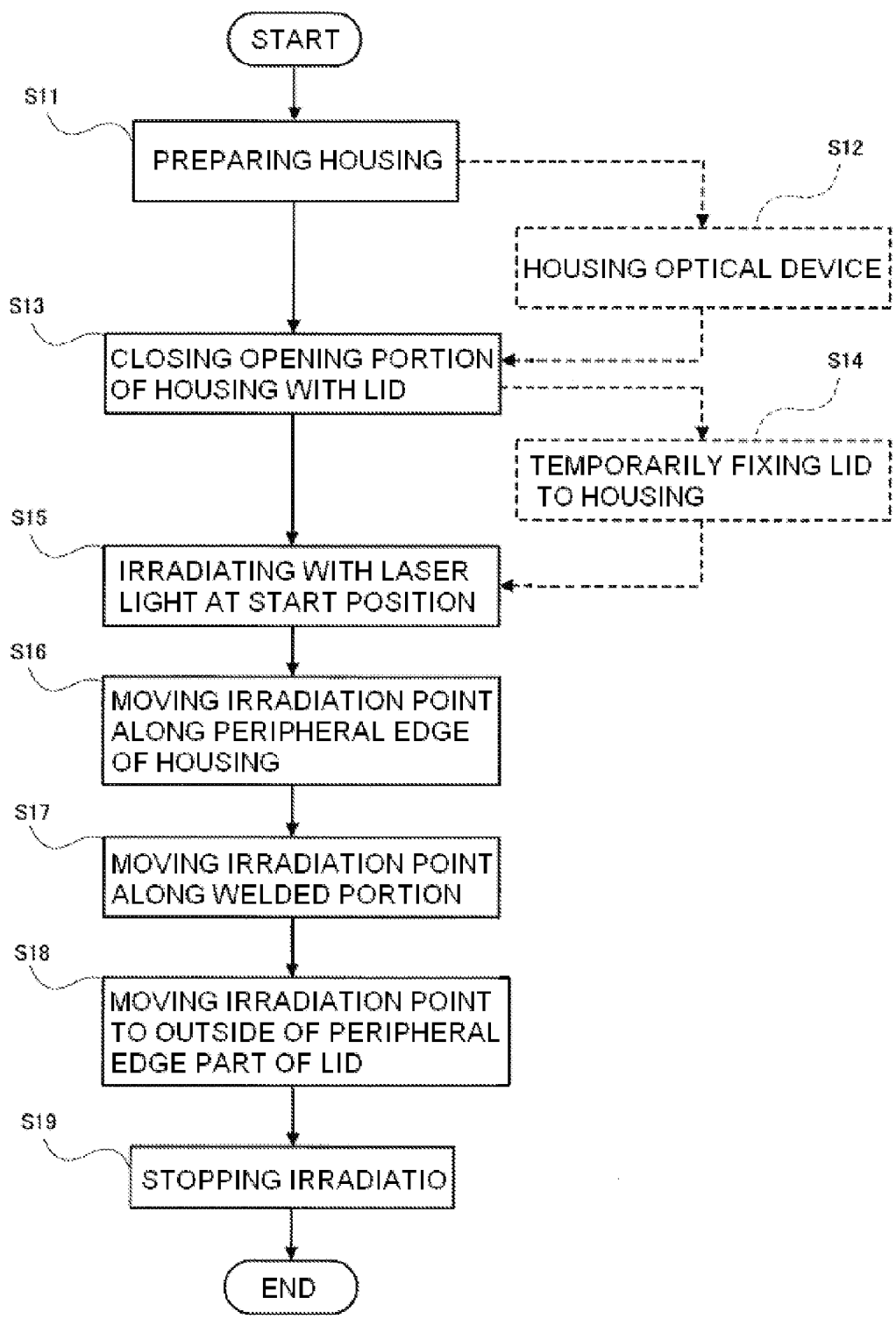
FIG. 10 This is a flowchart showing a method for welding the housing and the lid that the above-mentioned sealing component has.

Next, as one example of a closing step, the lid 20 is put on the upper edge 19b1 of the peripheral wall 19b of the housing 19 to thereby close the opening portion 19a (step S13 in FIG. 10).

Figure 11:
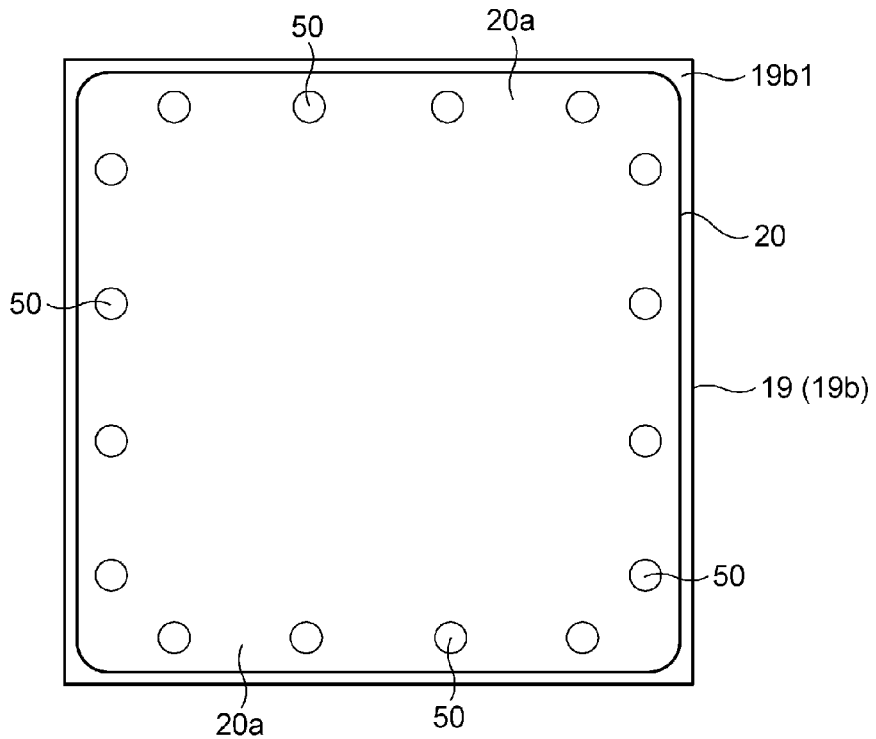
FIG. 11 This is a view showing a method for welding the housing and the lid that the above sealing component has.

Next, as one example of a temporary fixing step, the peripheral edge 20a of the lid 20 is irradiated with pulse oscillation laser light from the above at predetermined multiple positions (positions indicated by the circles in FIG. 11). A part of the thus-irradiated lid 20 is melted and bonded to the upper edge 19b1 of the peripheral wall 19b of the housing 19. Accordingly, the lid 20 is temporarily fixed to the housing 19 (step S14 in FIG. 10). In the following explanation, the position irradiated with pulse oscillation laser light for temporary fixation is referred to as the temporarily-fixed portion 50 for convenience sake.

Figure 12:
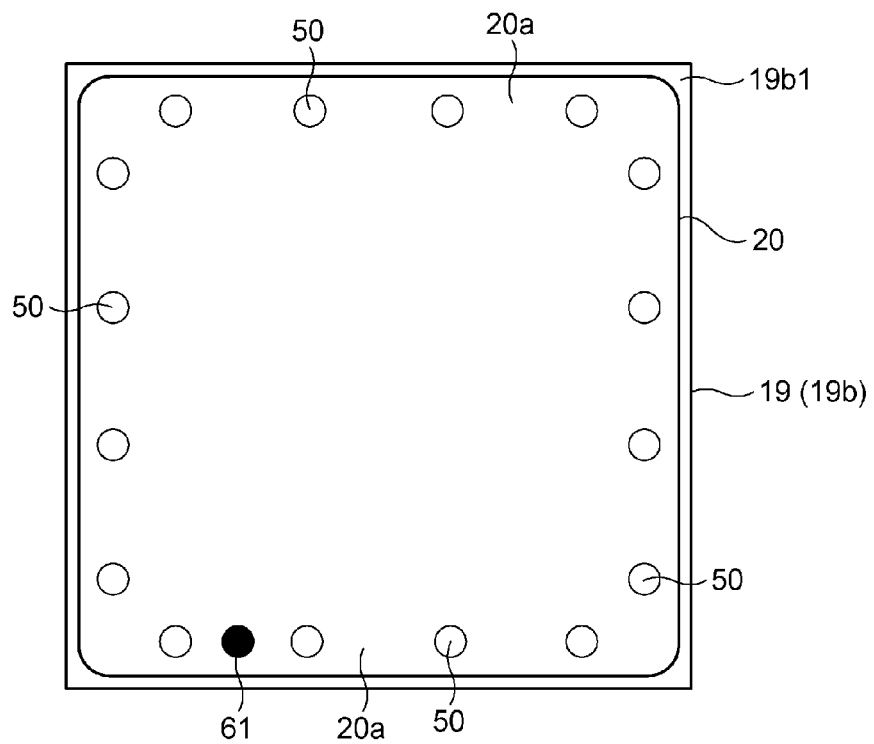
FIG. 12 This is a view showing a method for welding the housing and the lid that the above sealing component has.

Next, as shown in FIG. 12 and as one example of a welding step, the peripheral edge part 20a of the lid 20 is irradiated with continuous oscillation laser light at the predetermined start position 61 thereof (step S15 in FIG. 10). The irradiated part is melted by heat and bonded to the upper edge 19b1 of the peripheral wall 19b of the housing positioned below.

Figure 13:
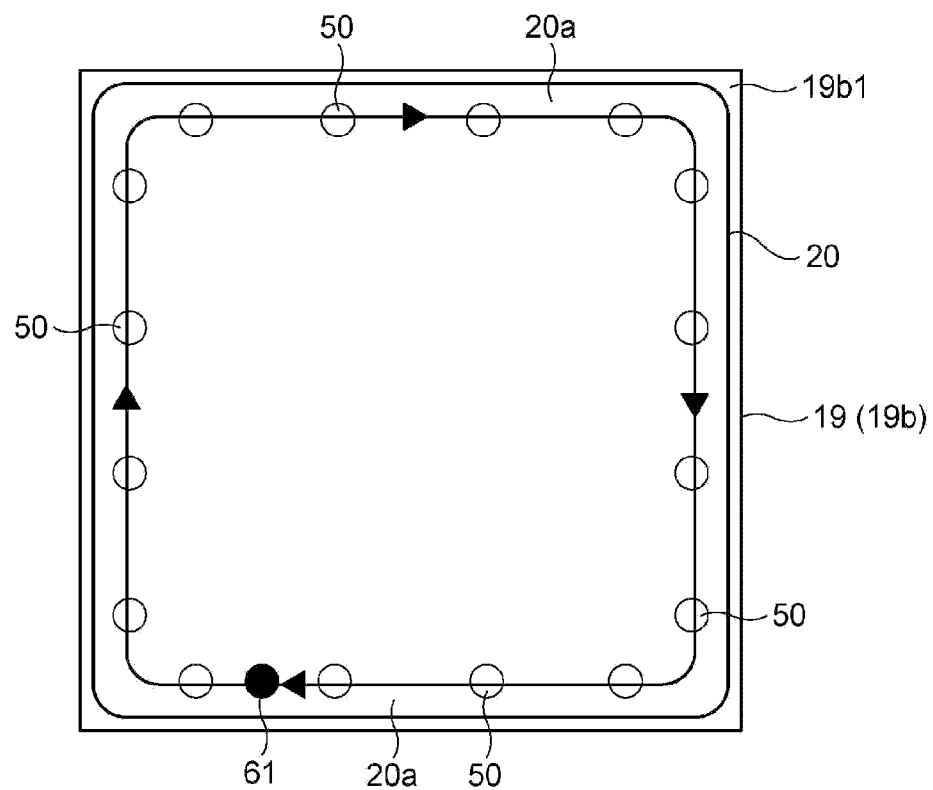
FIG. 13 This is a view showing a method for welding the housing and the lid that the above sealing component has.

Next, as shown in FIG. 13, the laser light irradiation point is moved along a predetermined route. Concretely, the irradiation point is moved along the peripheral edge of the lid 20 and following the temporarily-fixed portion 50, and therefore the irradiation is attained so that the moving route can form a loop along the entire length of the peripheral edge of the lid 20 (step S16 in FIG. 10). After the irradiation point has again returned back to the start position 61, the peripheral edge 20a of the lid 20 is welded to the upper edge 19b1 of the peripheral wall 19b, thereby forming the sealing space 30.

Figure 14:
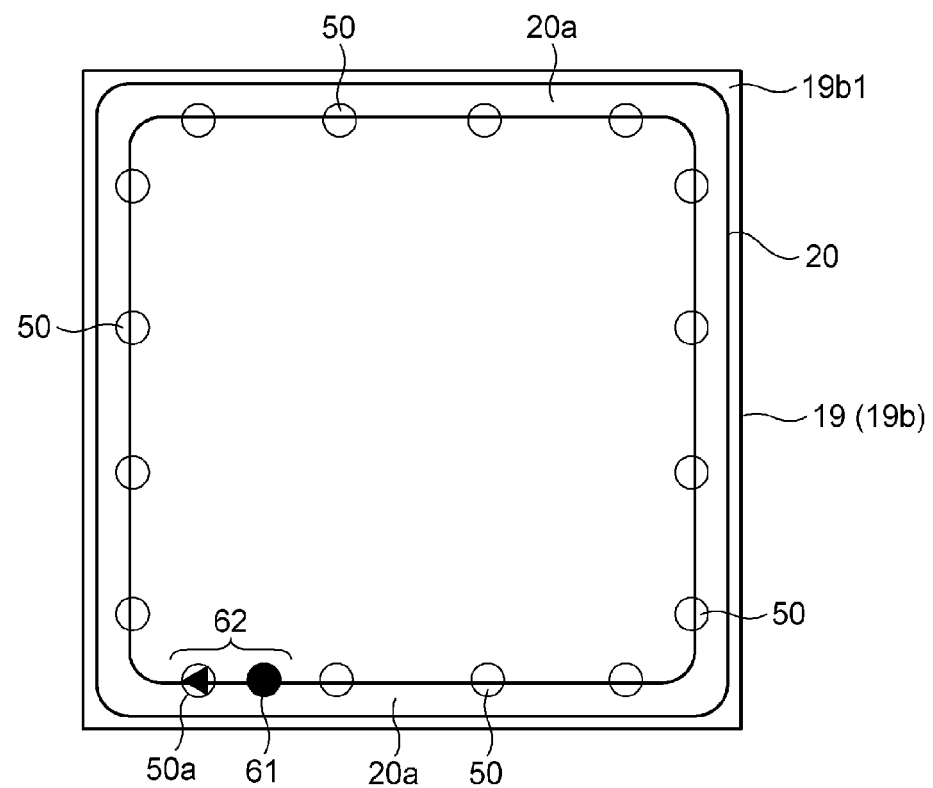
FIG. 14 This is a view showing a method for welding the housing and the lid that the above sealing component has.

Next, as shown in FIG. 14, the irradiation point is moved so as to trace along the welded portion 62 that includes the start position 61. Concretely, the irradiation point is so moved that the temporarily-fixed portion 50a which has been first irradiated with laser light could be again irradiated (step S17 in FIG. 10). In other words, the welded portion 62 includes the temporarily-fixed portion 50a that has been first irradiated with laser light.

Figure 15:
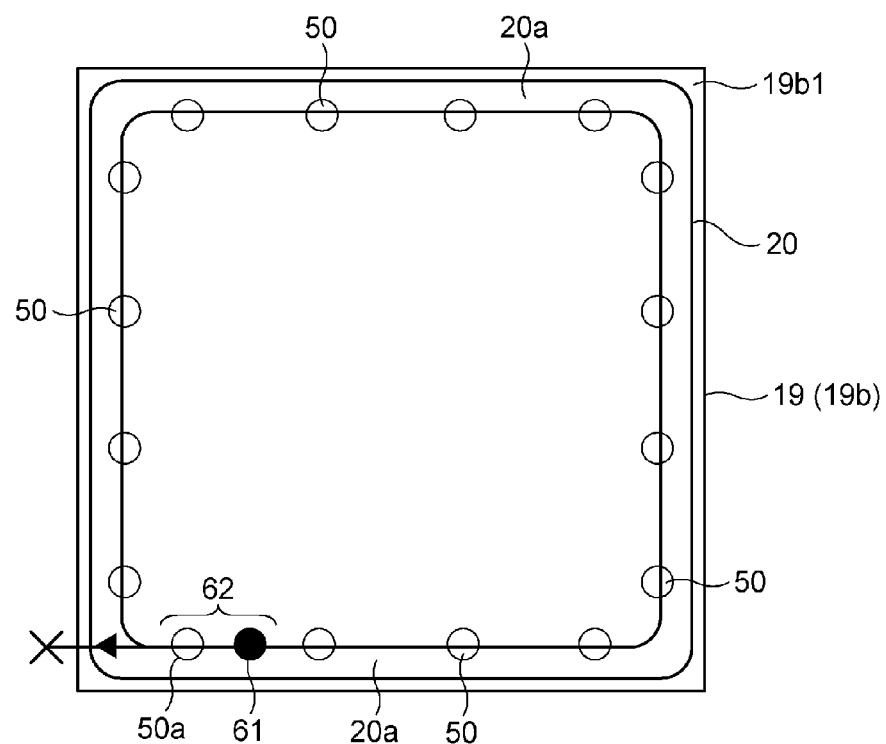
FIG. 15 This is a view showing a method for welding the housing and the lid that the above sealing component has.

Next, as shown in FIG. 15, starting from the welded portion 62 and straightly separating therefrom, the irradiation point is so moved as to reach the outside of the peripheral edge 20a of the lid 20 (step S18 in FIG. 10). The laser light irradiation is continued without interruptions during the movement of the irradiation point, and after the irradiation point has been moved to the outside of the peripheral wall 19b of the housing 19, the irradiation is stopped (step S19 in FIG. 10). The movement of the irradiation point is attained at a constant speed.

Figure 16:
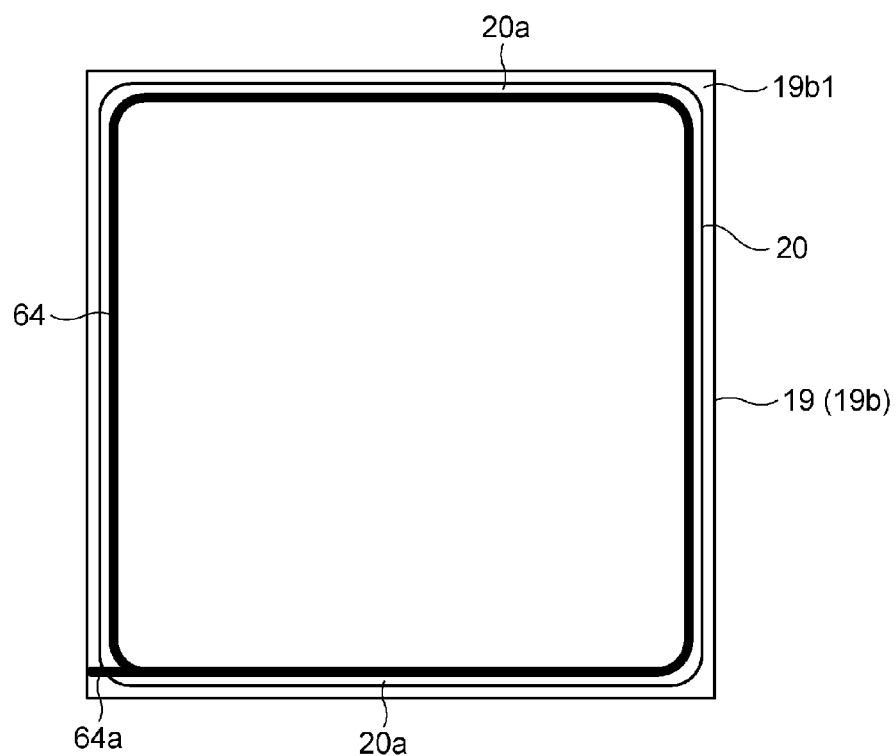
FIG. 16 This is a plan view from the above of the housing and the lid welded according to the above-mentioned method.

FIG. 16 is an outward appearance seen from the top of the lid 20 welded to the housing 19 in the manner as above. The weld impression 64 has remained on the top of the lid 20. The weld impression 64 forms a loop along the peripheral edge 20a of the lid 20, and the separate part 64a that is a part of the weld impression 64 reaches the outside of the peripheral edge 20a, after having separated from the loop.

For providing a desired weld state, various conditions of laser light irradiation are controlled, such as output power, the laser light moving speed and others. However, when the conditions have changed, the desired weld state could not be provided and a predetermined vapor that has been sealed up in the sealing space 30 may leak out.

As a result of repetition of assiduous studies, the present inventors have found that the laser light irradiation position at the end of welding may have some influence on the condition change. Concretely, the inventors have found that, when the irradiation is stopped in the state where the laser light irradiation point is above the lid, then the molten metal to form the lid at that position is rapidly cooled to thereby leave crater-like depression defects remaining therein. Such depression defects, if any, would form cracks in rapid cooling of the metal that forms the lid, thereby causing the above-mentioned leakage.

On the other hand, the inventors have further found that, when the above-mentioned trouble is evaded by weakening the output of the laser light at the position at which the irradiation point movement is stopped or at around the position, then the lid is prevented from being melted by the laser light irradiation and reflects the light, and as a result, the laser device of the light source is broken by the reflected light.

Therefore in this embodiment, during the period for while the irradiation point having moved from the start position 61 forms a loop and is again returned back to the start position 61, the laser light irradiation is not stopped. Further, the laser light irradiation is not also stopped above the welded portion 62 that includes the start position 61, and the irradiation is stopped after the irradiation point has been moved outside the housing 19. Consequently, during the period for while the irradiation point is above the lid 20, the controlled irradiation condition can be maintained and a desired weld state with no crack may be realized.

As a result, the sealing space 30 to be formed by welding the housing 19 and the lid 20 can be kept in a highly hermetic condition. Accordingly, a light metal such as aluminium or magnesium can be used for the housing 19 and the lid 20, and therefore the body weight of the sealing member 1 can be reduced, or that is, the vibration resistance thereof can be thereby improved. Further, the production cost can be reduced.

In this embodiment, the laser light to be moved along the peripheral edge of the lid 20 is continuous oscillation laser light, and therefore can evade the trouble of breaking the laser device of the light source by the reflected light from the lid 20. As a result, the laser light irradiation can be attained vertically from the top of the lid 20, therefore enabling welding operation in the best condition.

In this embodiment, the irradiation point is moved at a constant speed, and therefore the irradiation condition fluctuation can be minimized as much as possible. The invariance of the irradiation condition may contribute toward attaining a stable weld state with no cracking.

In this embodiment, before the welding, the peripheral edge 20a of the lid 20 is irradiated with pulse oscillation laser light at predetermined multiple positions to thereby form multiple temporarily-fixed portions 50 so that the lid 20 is temporarily fixed to the housing 19. The thermal deformation of the lid 20 to be caused by the laser light irradiation is hardly accumulated since the irradiation point moves, and therefore, it is possible to prevent the formation of a slight space between the housing 19 and the lid 20.

In this embodiment, the irradiation point is moved to follow the temporarily-fixed portion 50, and therefore the crater-like impression of the temporarily-fixed portion 50 can be erased away (the crater can be filled up with the melt of the lid 20). Accordingly, not only the outward appearance of the structure can be bettered but also a homogeneous weld state can be provided.

At the start of welding, the housing 19 and the lid 20 are not fully warmed up, the melting level thereof is low so that it would be insufficient to erase away the impression of the temporarily-fixed portion 50a that is first irradiated with laser light. In this embodiment, the temporarily-fixed portion 50a is included in the welded portion 62 along which the irradiation point having passed through the start position 61 may run, and therefore, the impression can be surely erased away.

In this embodiment, while the optical substrate 10a is kept fixed onto the bottom wall 19c and while the electric substrate 11a is kept fixed onto the inner face 10b of the lid 20, the lid 20 is irradiated with laser from the above thereof. Accordingly, the welding can be attained not imparting any thermal shock to the optical member mounted on the optical substrate.

The above-mentioned embodiment is for facilitating the understanding of the present invention and is not for limiting the invention. It is apparent that the invention may be changed and modified not overstepping the scope and the spirit thereof, and includes any equivalent to the invention.

Figure 17A:
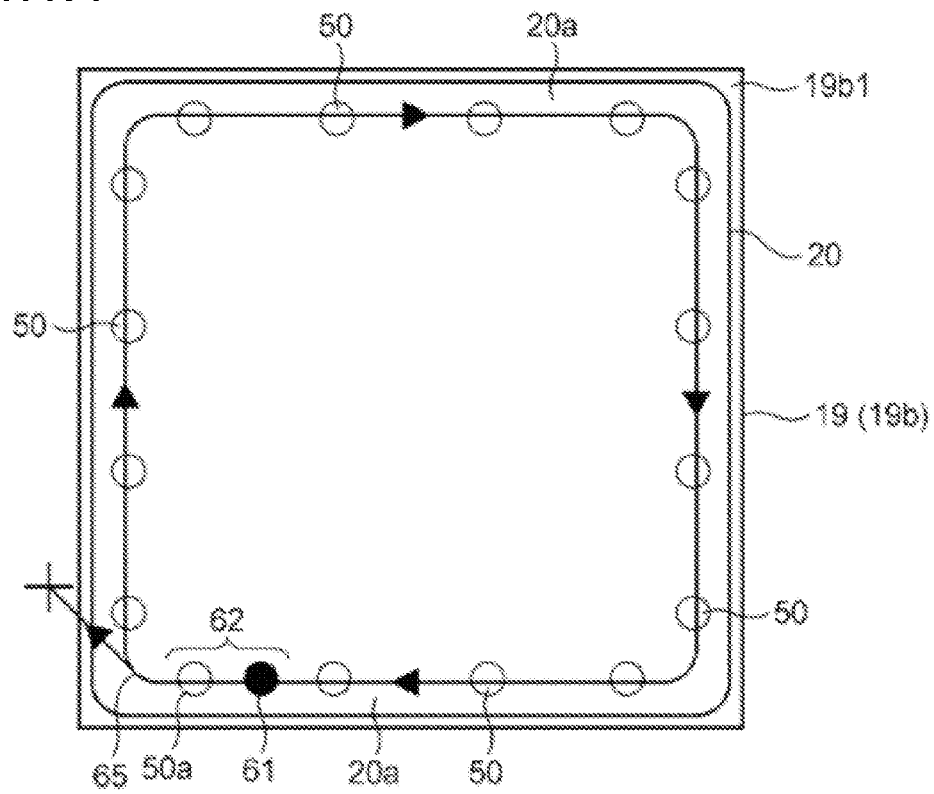
FIG. 17A This is a view showing another example of the method for welding the above housing and the lid.

The separation from the welded portion 62 after the irradiation point has passed through the start position 61 is not always needed to be attained in the linear direction along the linear portion. For example, as shown in FIG. 17A, the irradiation point may be separated while moving linearly from the corner 65. In other words, the separation may be attained while the irradiation point is moved in the tangential direction of the welded portion 62 in the separation position. In that manner, it is possible to separate the irradiation point while the irradiation condition fluctuation is kept minimized relative to the welded portion 62, and the homogeneousness of the weld state can be kept well.

Figure 17B:
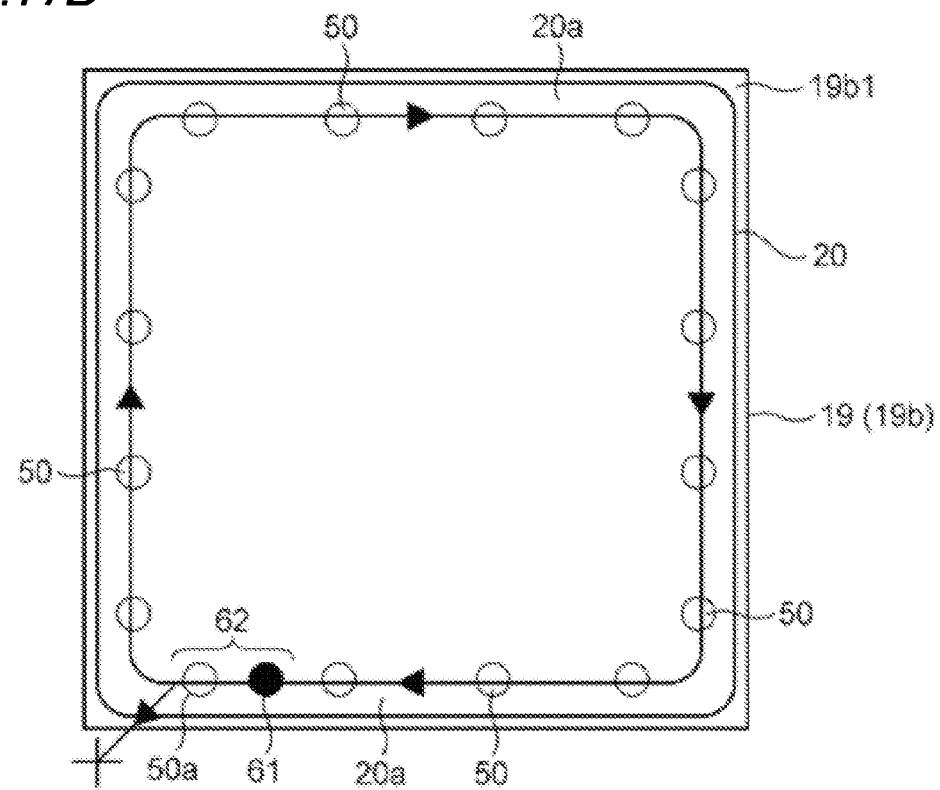
FIG. 17B This is a view showing another example of the method for welding the above housing and the lid.

The irradiation point may also be separated in a more oblique direction than in the welded portion 62, as shown in FIG. 17B.

The position at which the laser light irradiation is stopped is not always needed to be outside the peripheral wall 19b of the housing 19. Outside the peripheral edge 20a of the lid 20, the irradiation may be stopped above the upper edge 19b1 of the peripheral wall 19b.

It is not always indispensable to make the continuous oscillation laser light output power constant, to move the irradiation point at a constant speed and to temporarily fix the lid 20 to the housing 19 by the use of pulse oscillation laser light, and the conditions can be suitably changed.

The housing 19 and the lid 20 are not always needed to be formed of a light metal. Any metal may be used in accordance with the intended use of the sealing component.

The sealing space 30 to be formed by the housing 19 and the lid 20 is not always needed to be one for housing the optical device 2 therein. The present invention is applicable to any use that is required to have high-level hermeticity in the sealing space 30 to be formed by welding the housing 19 and the lid 20. In this case, the step of housing the optical device 2 in the housing 19, or that is, the step S12 in FIG. 10 may be replaced by any other step of housing a desired subject therein, or may be omitted.

By irradiation with pulse oscillation laser light at predetermined multiple sites in the peripheral edge 20a of the lid 20, the step of forming multiple temporarily-fixed portions 50 (step S14 in FIG. 10) may be omitted as the case may be.

The following subsidiary clauses are given relative to the above-mentioned embodiments.

[Clause 1]

A method for producing a sealing component provided with a sealing space, which comprises:

a preparation step of preparing a metallic housing that has a peripheral wall to form an opening portion, a closing step of arranging a metallic lid on the upper edge face of the peripheral wall to thereby close the opening portion, and a welding step of irradiating with laser light at the peripheral edge of the lid to weld the peripheral edge to the upper edge face of the peripheral wall thereby forming the sealing space, and wherein:

in the welding step, the point to be irradiated with the laser light is, after having been moved from the predetermined start position to the entire length of the peripheral edge of the lid, moved toward the outside of the peripheral edge of the lid so as to be separated from the welded portion after the welded portion including the start position has been partly reirradiated with the laser light, and in the welding step, the laser light irradiation is continued until the laser light irradiation point is moved to the outside of the peripheral edge.

[Clause 2]

The production method according to clause 1, wherein in the welding step, the irradiation point is moved from the welded portion toward the outside of the peripheral edge in linear movement.

[Clause 3]

The production method according to clause 1, wherein in the welding step, the laser light is continuous oscillation laser light.

[Clause 4]

The production method according to clause 1, wherein in the welding step, the irradiation point is moved at a constant speed.

[Clause 5]

The production method according to a clause 1, which further includes, prior to the welding step, a temporary fixation step of irradiating with pulse oscillation laser light at a predetermined position of the lid to thereby temporarily fix the lid to the housing, and wherein:

in the welding step, the irradiation point is moved so as to trace along the temporarily-fixed portion.

[Clause 6]

The production method according to clause 5, wherein the temporarily-fixed portion is included in a part of the welded portion.

[Clause 7]

The production method according to clause 1, wherein:

the preparation step includes a step of housing an optical device in the sealing space, the optical device is provided with a dispersive optics that receives an optical signal containing multiple signal components differing from each other in the wavelength and outputs the individual signal components in different directions to thereby separate the multiple signal components.

[Clause 8]

A sealing component comprising:

a metallic housing that has a peripheral wall to form an opening portion, and a metallic lid that closes the opening portion and forms a sealing space along with the former housing, wherein:

the peripheral edge of the lid is welded to the peripheral wall of the housing and forms a weld impression, the weld impression forms a loop along the peripheral edge, and a part of the weld impression reaches the outside of the peripheral edge from the loop.

[Clause 9]

The sealing component according to clause 8, wherein an optical device is housed in the sealing space, and wherein the optical device includes a dispersive optics that receives an optical signal containing multiple signal components differing from each other in the wavelength and outputs the individual signal components in different directions to thereby separate the multiple signal components.

[Clause 10]

The sealing component according to clause 9, wherein the optical device is further includes an optical substrate on which optical members constituting the dispersive optics are mounted, and an electric substrate on which electric members for electrically controlling the optical path of the individual signal components are mounted, and wherein the optical substrate is fixed to the bottom of the metallic housing.

[Clause 11]

The sealing component according to clause 9, wherein the optical device is further includes an optical substrate on which optical members constituting the dispersive optics are mounted, and an electric substrate on which electric members for electrically controlling the optical path of the individual signal components are mounted, and wherein the electric substrate is fixed to the inner face of the metallic lid.

The invention claimed is:

1. A sealing component to house an article inside the sealing space, including:
    a metallic housing that comprises a base, a side wall connected to the base, and an opening portion facing to the base, and
    a metallic lid to cover the opening portion, and wherein:
    the side wall has an upper edge to be bonded to the lid, an inner surface and an outer surface,
    a melted portion of the lid is formed around the boundary between the lid and the upper edge,
    the melted portion is formed to reach a corner at which the upper edge and the outer surface intersect with each other,
    the lid is bonded to the side wall such that the melted portion has a convexly-curved outward form from the top face of the lid to the corner in the longitudinal cross-sectional view of the sealing component,
    the melted portion is formed to reach the outer surface,
    the melted portion has a convexly-curved outward form that protrudes from the outer surface in the longitudinal cross-sectional view of the sealing component, and
    the melted portion that protrudes toward the outer surface is so arranged as not to be kept in contact with a metal layer provided on at least a part of the outer surface and the metal layer is formed of a metal differing from a metal to form the housing.

2. The sealing component according to claim 1, wherein:
    the melted portion has a radial form that expands radially from the deepest part thereof toward the outer surface in the longitudinal cross-sectional view of the sealing component,
    and the deepest part is positioned on a more outer side than the center in the thickness direction of the side wall.

3. The sealing component according to claim 1, wherein the metal to form the lid has a smaller foam content than the metal to form the housing.

4. The sealing component according to claim 1, wherein the metal to form the lid has an Si content of 0.3% or less.

5. The sealing component according to claim 1, wherein the metal to form the lid has a Cu content of 0.1% or less.

6. A sealing component to house an article inside the sealing space, including:
    a metallic housing that comprises a base, a side wall connected to the base, and an opening portion facing to the base, and
    a metallic lid to cover the opening portion, and wherein:
    the side wall has an upper edge to be bonded to the lid, an inner surface and an outer surface,
    a melted portion of the lid is formed around the boundary between the lid and the upper edge,
    the melted portion is formed to reach a corner at which the upper edge and the outer surface intersect with each other,
    the lid is bonded to the side wall such that the melted portion has a convexly-curved outward form from the top face of the lid to the corner in the longitudinal cross-sectional view of the sealing component, and
    the lid has a protruding portion that protrudes in the inside direction of the housing, and the protruding portion is provided so as to be spaced from the side wall via a clearance therebetween.

7. An optical device sealing structure including:
    a sealing component to house an article inside the sealing space, including:
        a metallic housing that comprises a base, a side wall connected to the base, and an opening portion facing to the base, and
        a metallic lid to cover the opening portion, and wherein:
        the side wall has an upper edge to be bonded to the lid, an inner surface and an outer surface,
        a melted portion of the lid is formed around the boundary between the lid and the , upper edge,
        the melted portion is formed to reach a corner at which the upper edge and the outer surface intersect with each other, and
        the lid is bonded to the side wall such that the melted portion has a convexly-curved outward form from the top face of the lid to the corner in the longitudinal cross-sectional view of the sealing component; and
    an optical device housed inside the sealing space of the sealing component, wherein:
    the optical device includes a dispersive optics that receives an optical signal containing multiple signal components differing from each other in the wavelength and outputs the individual signal components in different directions to thereby separate the multiple signal components,
    the optical device is further including an optical substrate on which optical members constituting the dispersive optics are mounted, and an electric substrate on which electric members for electrically controlling the optical path of the individual signal components are mounted, and
    the optical substrate is fixed to the bottom of the housing.

8. The optical device sealing structure according to claim 7, wherein:
    the electric substrate is fixed to the inner face of the lid.

9. An optical device sealing structure including:
    a sealing component to house an article inside the sealing space, including:
        a metallic housing that comprises a base, a side wall connected to the base, and an opening portion facing to the base, and
        a metallic lid to cover the opening portion, and wherein:
        the side wall has an upper edge to be bonded to the lid, an inner surface and an outer surface,
        a melted portion of the lid is formed around the boundary between the lid and the upper edge, the melted portion is formed to reach a corner at which the upper edge and the outer surface intersect with each other, and the lid is bonded to the side wall such that the melted portion has a convexly-curved outward form from the top face of the lid to the corner in the longitudinal cross-sectional view of the sealing component; and an optical device housed inside the sealing space of the sealing component, wherein:

the optical device includes a dispersive optics that receives an optical signal containing multiple signal components differing from each other in the wavelength and outputs the individual signal components in different directions to thereby separate the multiple signal components, and the gas leakage though the sealing component therein is $5\times10^{-9}$ Pa·m$^3$/sec or less.

* * * * *